United States Patent [19]
Miller

[11] Patent Number: 5,850,959
[45] Date of Patent: *Dec. 22, 1998

[54] MULTIFARIOUS, VEHICLE CARGO CARRIER SYSTEM

[75] Inventor: Thomas S. Miller, 4 Shadow Wood La., Sandy, Utah 84092

[73] Assignee: Thomas S. Miller, Salt Lake City, Utah

[ * ] Notice: The terminal 15 months of this patent has been disclaimed.

[21] Appl. No.: 227,666

[22] Filed: Apr. 14, 1994

[51] Int. Cl.$^6$ ............................. B60R 9/10; B60R 9/12
[52] U.S. Cl. ..................... 224/535; 224/532; 224/506; 224/521; 224/917.5; 224/924
[58] Field of Search ............... 224/42.03 A, 42.03 B, 224/42.04, 42.05, 42.06, 42.07, 42.08, 280, 282, 488, 502–509, 518–521, 522, 531–537, 924, 917.5

[56] References Cited

U.S. PATENT DOCUMENTS

| | | | |
|---|---|---|---|
| 4,009,744 | 3/1977 | Joslyn | 224/532 |
| 4,381,069 | 4/1983 | Kreck | 224/42.03 R |
| 4,400,129 | 8/1983 | Eisenberg et al. | 224/42.03 R |
| 4,413,761 | 11/1983 | Angel | 224/42.03 R |
| 4,856,686 | 8/1989 | Workentine | 224/42.03 B |
| 4,938,399 | 7/1990 | Hull et al. | 224/42.03 A |
| 4,971,509 | 11/1990 | Sechovel et al. | 414/462 |
| 4,989,765 | 2/1991 | Huebner | 224/42.07 |
| 5,004,133 | 4/1991 | Wyers | 224/924 |
| 5,018,651 | 5/1991 | Hull et al. | 224/42.44 |
| 5,029,740 | 7/1991 | Cox | 224/42.01 |
| 5,067,641 | 11/1991 | Johnson et al. | 224/42.03 R |
| 5,094,373 | 3/1992 | Lovel | 224/42.08 |
| 5,181,822 | 1/1993 | Allsop et al. | 224/42.08 |
| 5,190,195 | 3/1993 | Fullhart et al. | 224/42.03 B |
| 5,219,105 | 6/1993 | Kravitz | 224/42.03 B |
| 5,232,135 | 8/1993 | Marren | 224/42.43 |
| 5,303,857 | 4/1994 | Hewson | 224/42.03 B |
| 5,330,084 | 7/1994 | Peters | 224/42.03 B |

FOREIGN PATENT DOCUMENTS 40 11 315.9  10/1991  Germany .

Primary Examiner—Henry J. Recla
Assistant Examiner—Gregory M. Vidovich

[57] ABSTRACT

A multifarious cargo carrier system for mounting on the rear of a vehicles having hitch receivers, step bumper hitches, custom hitches, or other means of attachment. The carrier system includes a base member having one end connectable within a hitch receiver and the other end attachable to a step bumper hitch or custom hitch. A tightening pin is used to tightly secure the base within a hitch receiver. Tightening pins are also used to connect the proximal end of a support arm to either end of the base and to attach the carrier assembly to the distal end of the support arm. The use of tightening pins allows the base to be folded up against the support arm and the carrier assembly to be folded down against the support arm for shipping and storage, as well as permitting access to the rear of the vehicle by pivoting the support arm down and and away from the vehicle. Cargo is carried on parallel cargo/carrier bars and secured by sliding the distal ends of the cargo/carrier bars through matching holes in the security assembly and sliding the security bar of the security assembly through the security hole in the locking plate of the cargo assembly and placing a locking device through the lock hole in the security bar. Equipment such as bicycles, skis, and snowboards can be carried on a single multi-use carrier without the need for additional accessories. An optional bottom bracket and security assembly doubles the capacity of the multi-use carrier to transport skis, snowboards and similar equipment. A cargo box carrier which can be loaded at ground level and transported vertically behind the vehicle utilizes the same base as the multi-use carrier.

6 Claims, 10 Drawing Sheets

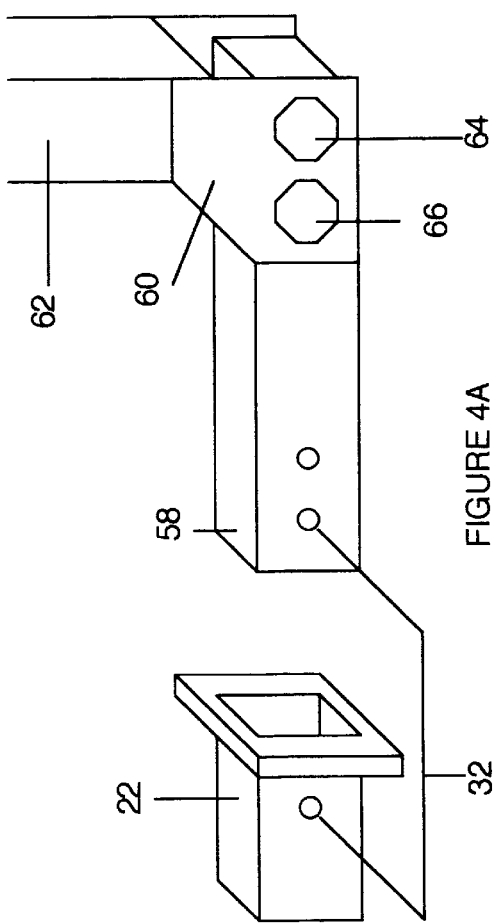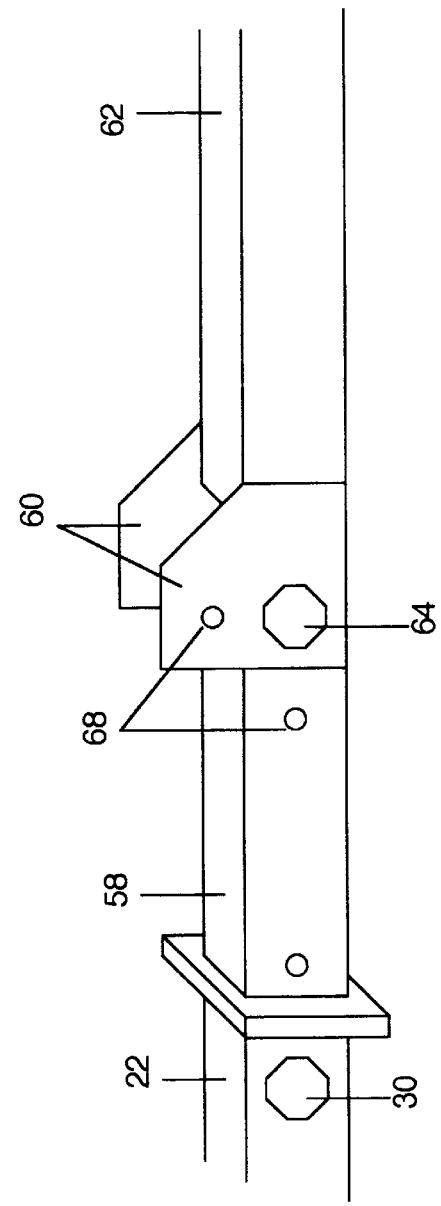

MULTIFARIOUS, VEHICLE CARGO CARRIER SYSTEM

BACKGROUND

1. Field of Invention

This invention relates to motor vehicle trailer hitch mounted cargo carriers.

2. Description of Prior Art

Many forms of carriers are available for owners to increase the cargo capacity of their vehicles. The most common of these are roof top systems. For years the roof top cargo box was the traditional choice of carrier. But the huge growth of cycling, skiing, snowboarding, and other activities provided a new market.

While these roof top carriers do permit the transportation of different types of sport and recreational equipment, the carriers also have serious shortcomings. These systems require time consuming assembly and mounting; are awkward to load on top of vehicles; produce considerable wind resistance which is stressful to the equipment and reduces gas mileage; require different expensive accessories for each type of equipment; require special mounting brackets for each type of car roof; and result in damage to loaded equipment when the owner forgets the loaded carrier and drives into a garage or under an overhang.

Recognizing the short-comings of roof top carrier systems, inventors saw the advantages of trailer hitch mounted carriers. One of the first inventions is U.S. Pat. No. 4,971,509 to Sechovec (1990), a carrier for handicapped vehicles. This carrier is comprised of a fulcrum frame which is adapted to be mounted rigidly to a square hitch receiver (FIG. 1a) at the rear of a vehicle. Electirc powered handicapped vehicles can be transported by this carrier. This carrier is not a multi-use carrier and can not be attached to step bumpers (FIG. 1b) or custom hitches (FIG. 1c).

U.S. Pat. No. 5,018,651 to Hull and Curry (1991) relates to a side or end dump article carrier. This carrier attaches to the vehicle by means of a standard square hitch receiver and permits off loading by pivoting the carrier either to the side or rear of the vehicle. This invention has limited application for carrying sports and recreation equipment, can not be attached to a step bumper or custom hitch, prevents access to the rear of the vehicle, and its use is restricted by vehicles with externally mounted spare tires.

U.S. Pat. No. 5,029,740 to Cox (1991) describes a luggage rack for vehicles which also attaches only to a square hitch receiver. While the cargo box is suitable for carrying luggage, it will not accommodate sports and recreational equipment. External spare tires again inhibit the function of the pivoting arms and there is no way to mount the carrier on other types of hitches.

German Patent DE 4011-315-A to Harder (1991) is a bicycle carrier with a frame that fastens pivotally to an upright bar. This carrier bolts directly to the vehicle and does not utilize a hitch in any way.

Lovci's (1992) U.S. Pat. No. 5,094,373 does address the multiple hitch problem by providing two different attachment assemblies and the hinged carrier also permits access to the rear of the vehicle. Multiple use is accommodated by separate bicycle, tire and gas container, and ski assemblies. Again, externally mounted spare tires would restrict the use of this carrier. The carrier is very large and bulky and takes considerable area to store when not in use.

U.S. Pat. No. 5,181,822 to Allsop, Inc. (1993) relates to another hitch receiver carrier designed to carry bicycles and skis with the use of equipment specific attachments. It also swings away from the rear doors but can not accommodate different hitches or external spare tires and lacks a means of locking equipment to the carrier and the carrier to the vehicle.

The trunk top carrier described in U.S. Pat. No. 5,232,135 to Marren (1993) is designed for use with passenger cars. This carrier mounts on a receiver hitch and its cargo box is positioned above the vehicle trunk. The cargo box will swing around allowing access to the trunk. This is not a multi-use carrier, but a towing ball on the base of the carrier does permit towing a trailer while the carrier is in place over the trunk. Once again, this carrier can not accommodate step bumper or custom hitches or external spare tires.

Disadvantages common to the prior art relative to hitch mounted carrier systems include:

(a) They typically can not be mounted on hitch receivers, step bumpers, or custom hitches without some kind of adaptor assembly.

(b) Current hitch carriers typically can not accommodate external spare tires.

(c) Prior multi-use art does not permit towing a trailer when the carrier is mounted.

(d) Those prior carriers that do permit access to the rear of the vehicle do so, but with a loss of rigidity in the carrier frame.

(e) The prior art requires equipment specific accessories to carry bicycles, skis, or other equipment.

(f) The carriers in present use are bulky in size, require assembly, and take considerable space to ship or store when not in use.

OBJECTS AND ADVANTAGES

Several objects and advantages of the present invention are:

(a) to provide a carrier that can be mounted on square hitch receivers, step bumpers, or custom hitches.

(b) to provide a carrier that can be used on vehicles with externally mounted spare tires.

(c) to provide a carrier that permits towing a trailer when used with a square hitch receiver.

(d) to provide a carrier that tightens securely against the side wall of the hitch receiver.

(e) to provide a carrier that allows access to the rear of the vehicle without any loss of carrier rigidity.

(f) to provide a single multi-use carrier that can transport recreational equipment including bicycles, snow skis, water skis, and snowboards.

(g) to provide a carrier that has a hinged support arm that can be detached and allows the attachment of a pivoting cargo box.

(h) to provide a carrier that can be expanded to double the number of skis or snowboards carried by attaching an inexpensive ski attachment assembly.

(i) to provide a carrier base that folds up against the model arm and a carrier assembly that folds down against the model arm. The folded carrier is convenient to ship and store when not in use.

(j) to provide a carrier system with a means of connecting the base to the hitch tightly and a means of pivotally connecting the support arm to the carrier base and carrier assembly that provides rigidity within the frame when tightened for traveling.

Further objects and advantages are to provide a carrier system that requires no assembly, is simple to mount and easy to load, does not require costly accessories to transport different kinds of equipment, and is built to last. Still further objects and advantages will become obvious from a consideration of the ensuing description and drawings.

DRAWING FIGS.

In the drawings, closely related figures have the same number but different alphabetic suffices.

FIGS. 1A, 1B, and 1C show the three most common types of trailer hitches.

FIGS. 2A, 2B, and 2C show the standard and long bases in the hitch receiver and step bumper/custom hitch positions.

FIGS. 4A and 4B show the hitch receiver mounted carrier base with the model arm in the up and down positions.

Figure 1A:
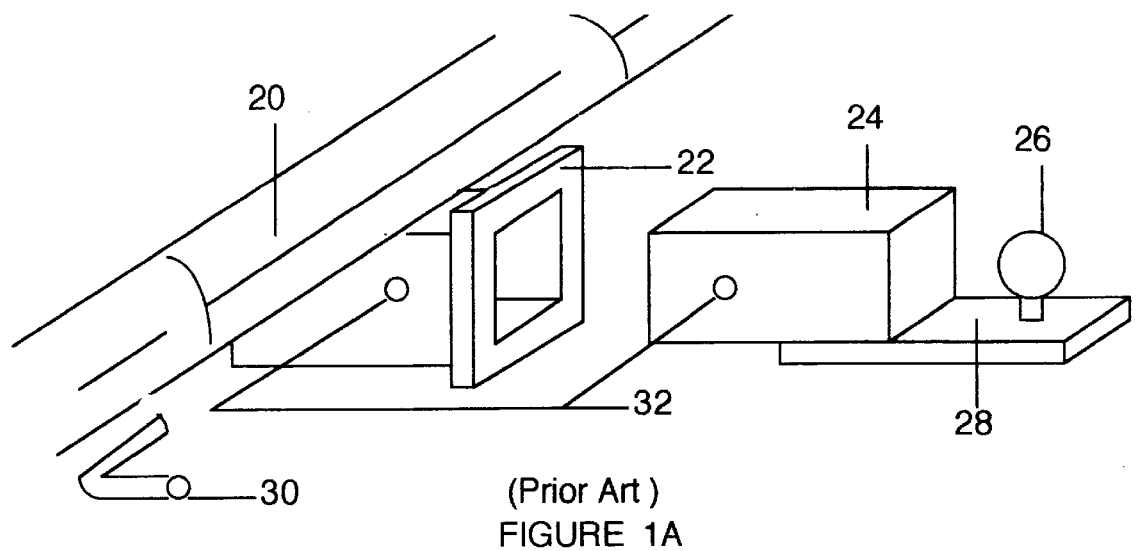

| Reference Numerals In Drawings | |
|---|---|
| 20 Bumper | 22 Receiver |
| 24 Hitch | 26 Towing Ball |
| 28 Towing Plate | 30 Hitch Pin |
| 32 Hitch Pin Holes | 34 Step Bumper |
| 35 Custom Hitch | 36 Standard Base |
| 38 Standard Base (Inverted) | 39 Towing Plate Hole |
| 40 Nut | 42 Hinge Stop/Towing Plate |
| 43 Towing Plate Slot | 44 Tightening Pin Holes |
| 46 Long Base | 48 Towing Ball or Bolt |
| 50 Head | 51 Conventional Pin Head |
| 52 Threads | 53 Conventional Pin Shaft |
| 54 Shaft | 55 Conventional Pin Locking Hole |
| 56 Locking Hole | 57 Tightening Pin |
| 58 Base (either standard/long) | 59 Skis |
| 60 Hinge Plates | 62 Pivoting Model Arm |
| 64 Hinge Pin | 66 Base Pin |
| 68 Base Pin Holes | 74 Custom Hitch or Step Bumper |
| 76 Base Pin Holes | 78 Cargo Carrier |
| 80 Cargo Model Arm | 82 Cargo Box Lid, Open |
| 84 Carrier Hinge Plate | 86 Carrier Pin |
| 87 Carrier Pin Holes | 88 Cargo Bar & Cushion |
| 90 Security Bar & Cushion | 92 Lock Hole |
| 94 Security Plate | 96 Cross Bar |
| 95 Bottem Bracket | 97 Security Bracket |
| 98 Locking Plate | 99 Security Hole |

DESCRIPTION—FIGS. 1–8

Figure 1B:
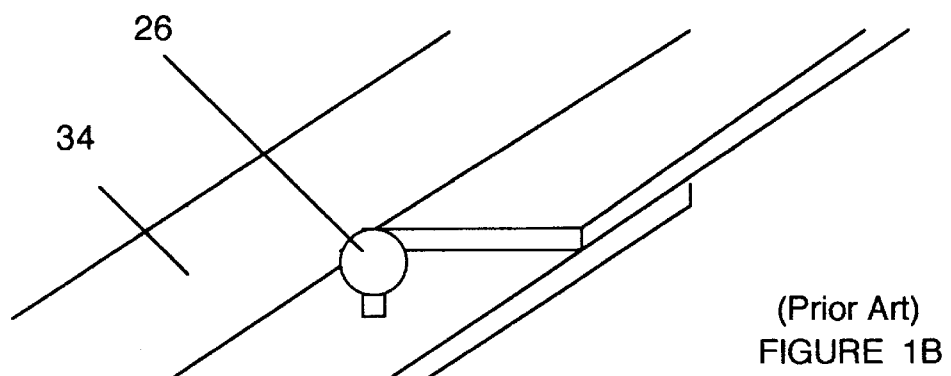
Figure 1C:
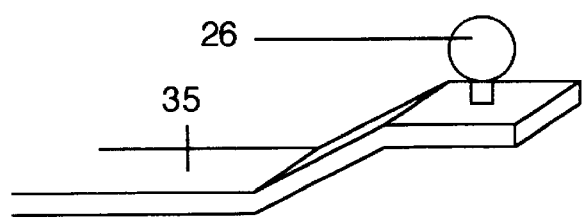

Traditional trailer hitches are illustrated in FIGS. 1A, 1B, and 1C. In the Square Receiver Hitch configuration shown in FIG. 1A, a receiver 22 is attached to the undercarriage or frame of the rear of the vehicle beneath a bumper 20. A square hitch 24 includes a towing plate 28 and a towing ball 26 at the distal end, and a hitch pin hole 32 at the proximal end. Hitch 24 is inserted into receiver 22 and held in place by a hitch pin 30. A tongue of a trailer can then be attached directly to towing ball 26. In a step bumper 34, as depicted in FIG. 1B, the rear bumper has a factory drilled hole through which towing ball 26 is attached for pulling a trailer. A custom hitch 35, as shown in FIG. 1C, is attached to the rear frame or undercarriage of the vehicle and extends beyond the rear bumper. A hole is drilled in the distal end of custom hitch 35 and towing ball 26 attached.

Figure 2A:
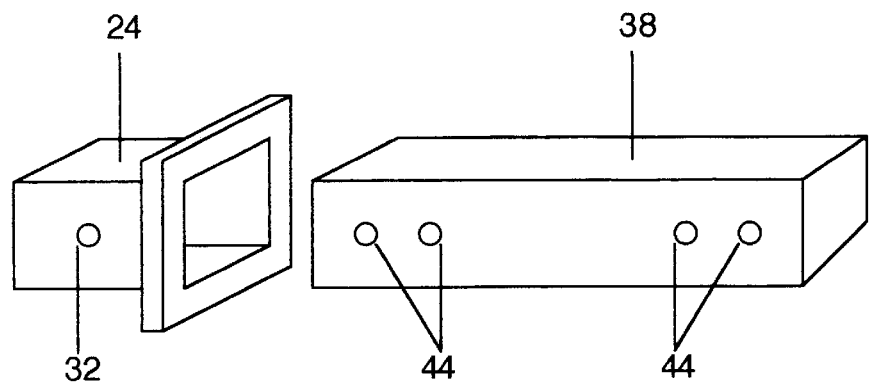
Figure 2B:
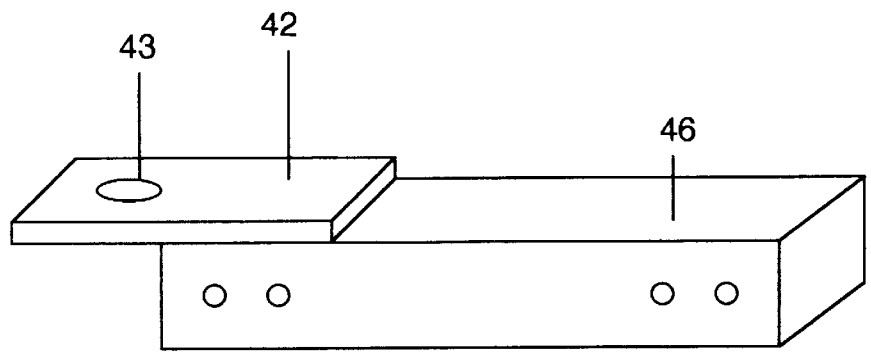
Figure 2C:
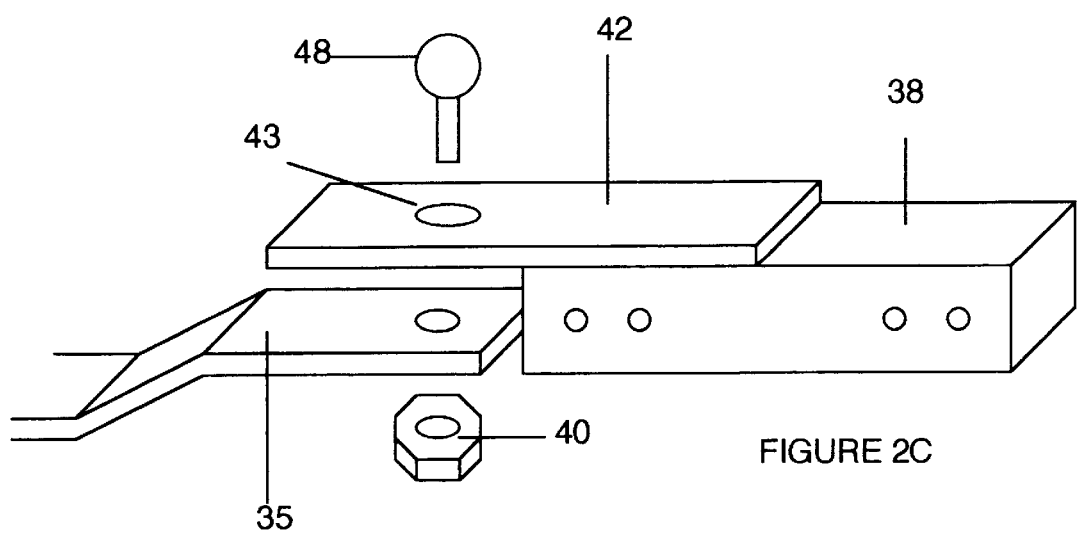

Typical embodiments of the base of the present invention are illustrated in FIGS. 2A, 2B, and 2C. FIG. 2A illustrates a standard length carrier base 38 in position for use with hitch receiver 24. Standard base 38 includes two sets of equally spaced, threaded, tightening pin holes 44, one set in the distal end and one set in the proximal end relative to hitch receiver 24. One end of standard base 38 has a hinge stop/towing plate 42 to which towing ball 26 may be bolted through a towing plate hole 39 or a slot 43 (FIGS. 2B and 2C). FIG. 2B shows a long base 44 that is similar to standard base 38 with the exception that the longer length allows the carrier to be mounted and used with vehicles that have an externally mounted spare tire on the rear of the vehicle. In both cases, the towing ball is held in place by a nut 40. FIG. 2B and 2C both show towing plate slot 43 instead of towing plate hole 39. Slot 43 allows the base to accommodate step bumpers or custom hitches which have towing holes at different distances to the outside edge of the bumper. FIG. 2C depicts standard base 38 in the step bumper or custom hitch position. By switching the distal and proximal ends of base 38, the carrier can be attached directly to the custom hitch 35 by either a towing ball or bolt 48. When installed, carrier base 38 is turned upside down and positioned snugly against the bumper or custom hitch and bolted into place. In the remainder of this description section, a base 58 is used to indicate that the subject matter is equally applicable to both standard base 38 and long base 44 in either the receiver hitch or step bumper/custom hitch positions.

Figure 3A:
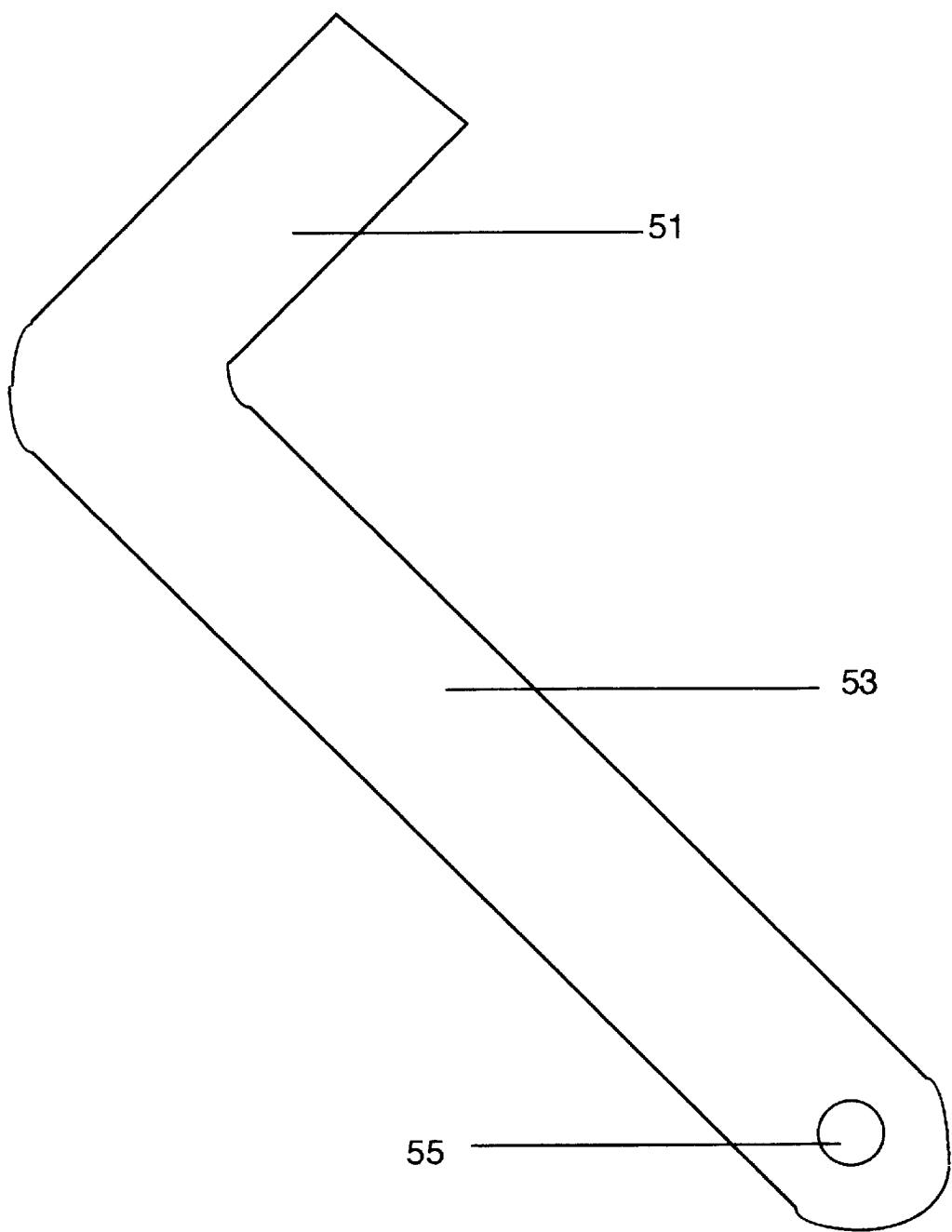
FIG. 3A shows a conventional connecting pin and FIG. 3B shows a tightening pin.

Referring now to FIG. 3A there is shown a conventional connecting pin as is used with hitch receivers or to permit pivoting of carrier support arms. The connecting pin includes a lever 51, a smooth shaft 53, and a locking hole 55. In use, the connecting pin is inserted through hitch pin holes 32 in the receiver and the base (FIG. 1A) so that lever 51 is positioned on one side of the hitch receiver, and the locking hole extends from the opposing side of the receiver. A safety pin (not shown) is inserted through hole 55 so as to maintain the connecting pin in position and thereby hold the base within the hitch receiver. Similarly, a supporting arm(s) may be attached to the carrier base with one or more connector pins. It should be noted that because there is required clearance between the shaft of the pins and the holes in the receiver, base, and support arm(s) there can be a loss of rigidity in the carrier frame. In particular, the connecting pins do not provide rigidity in that they allow the hitch receiver and base or other analogous structures to move relative to one another. Such arrangement is disadvantageous in that it allows for rattling and carrier sway and can result in considerable vibration of the items transported by the carrier system.

Figure 3B:
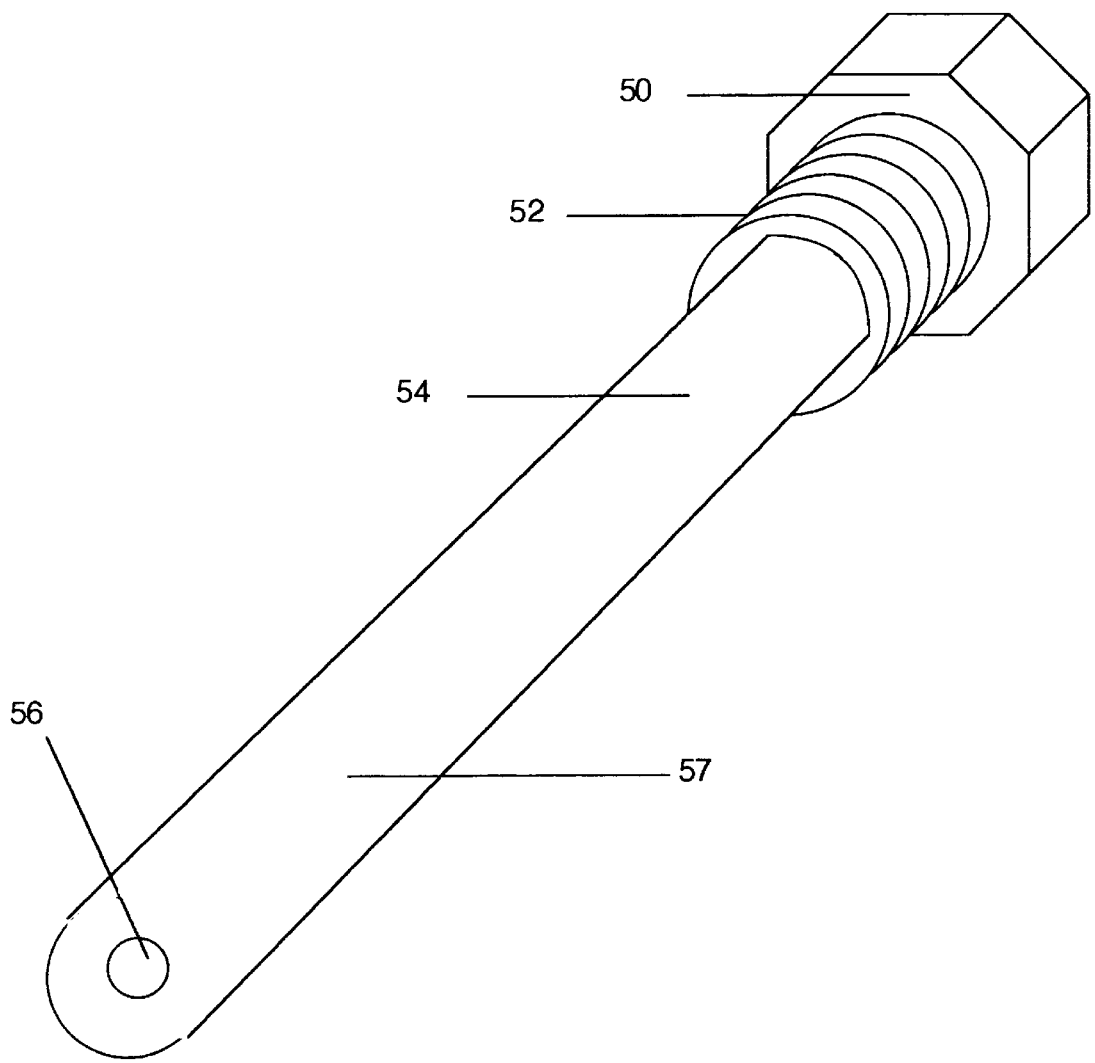

Referring now to FIG. 3B, there is shown a tightening pin 57 which secures the base to the hitch receiver, the support arm to the base, and the carrier assembly to the support arm. Tightening pin 57 is unique from conventional pin 51 (FIG. 3A) in that tightening pin 57 includes a head 50, threads 52, a shaft 54, and a locking hole 56. In use, female threads are formed in tightening pin holes 44 (FIG. 2A) in the base so as to nest with male threads 52 on tightening pin 57. It is anticipated that no such female threads will be provided in the hinge plate of the support arm or in the hitch receiver. When tightening pin 57 is passed through one side of the hitch receiver and inserted into the base, it is rotated so that male threads 52 of tightening pin 57 nest with the female threads of tightening pin holes 44 (FIG. 2A) of the base. Thereby pulling head 50 toward the base and holding the hitch receiver or hinge plate firmly between head 50 and the base.

This relationship allows for a carrier system which is relatively rigid compared to the systems using conventional connecting pins. The threads provide a more secure attachment which can also be further secured by placing a pin, wire clip, or lock through locking hole 56.

FIGS. 4A and 4B illustrate base 58 in the hitch receiver configuration and a pivoting model arm 62 of the carrier in the up or vertical position, which is used for carrying gear and equipment, and the down or horizontal position, which is used when access to the rear of the vehicle is desired. A hitch pin 30 attaches base 58 securely to hitch receiver 22. In the up position, a base pin 66 locks pivoting arm 62 in place while a hinge pin 64 permits model arm 62 to pivot when base pin 66 is removed. Hinge stop/towing plate 42 prevents model arm 62 from pivoting past horizontal in the down position.

Figure 5:
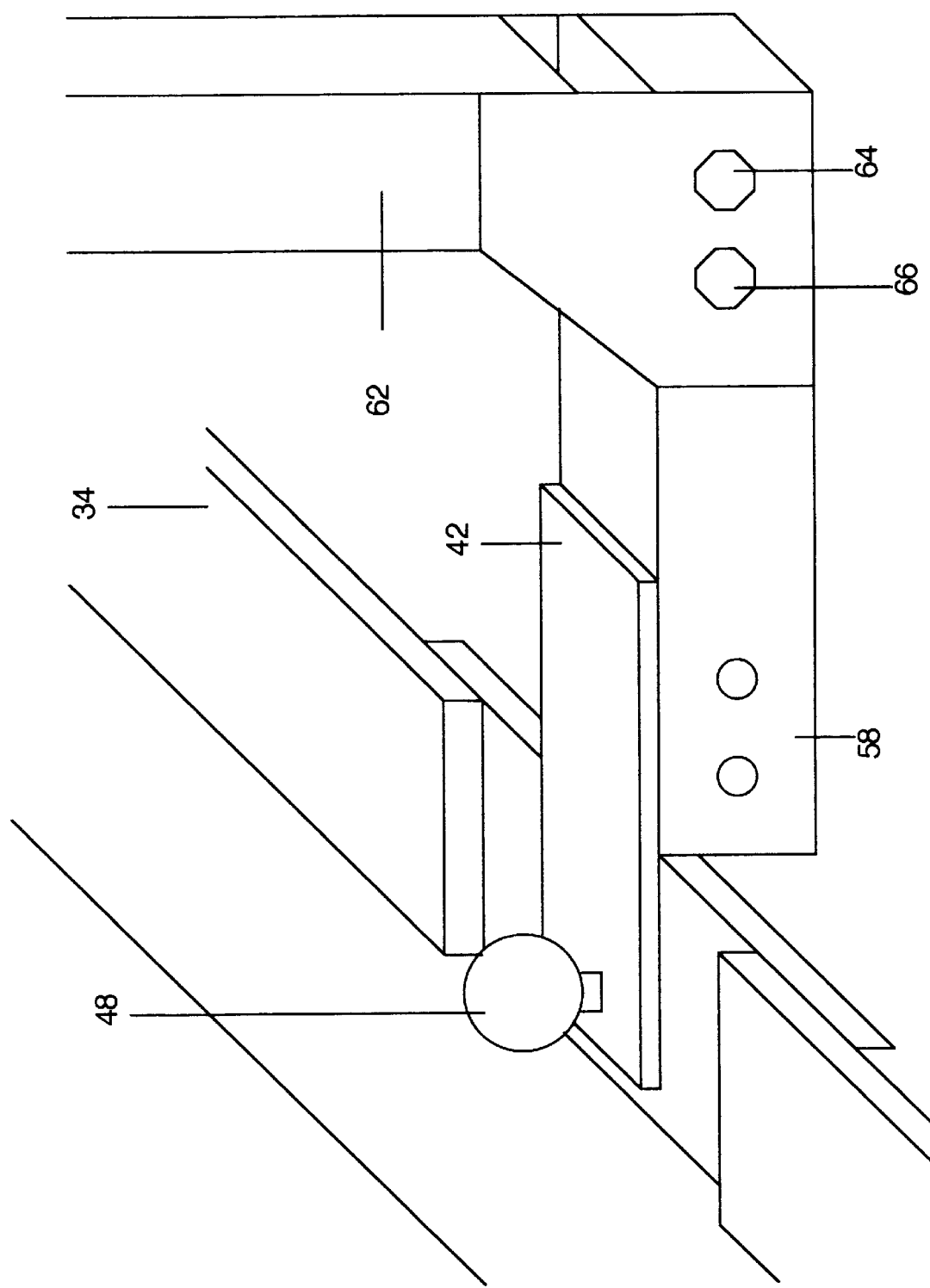
FIG. 5 shows the carrier base mounted on a step bumper.

FIG. 5 illustrates hinge stop/towing plate 42 attached by towing ball or bolt 48 through a custom drilled hole that is designed to fit a specific make or model of step bumper 34 that comes as standard equipment on the vehicle.

Figure 6A:
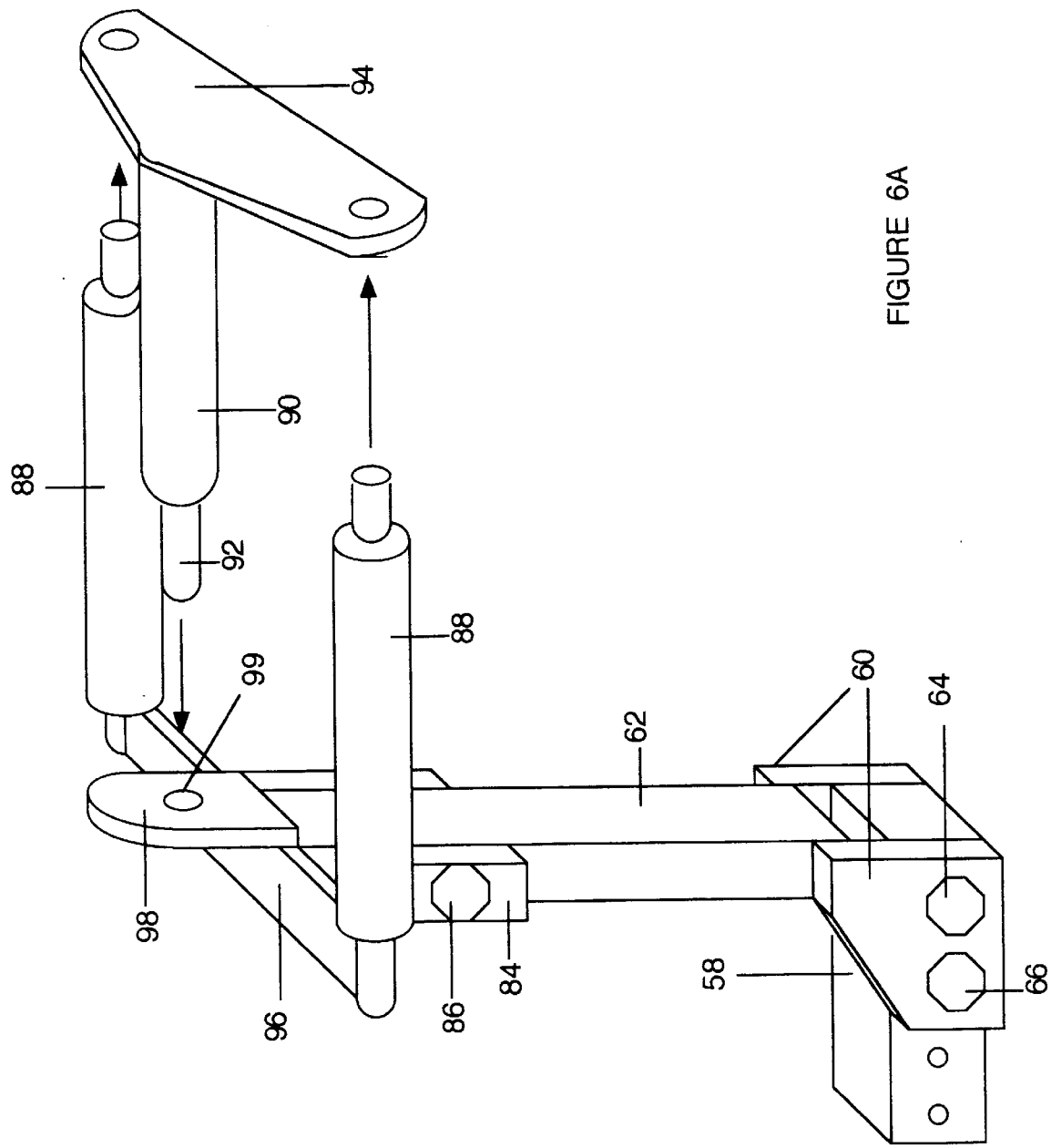
FIGS. 6A and 6B show the multi-use carrier assembly in the up or horizontal position and down or verrtical positions.
Figure 6B:
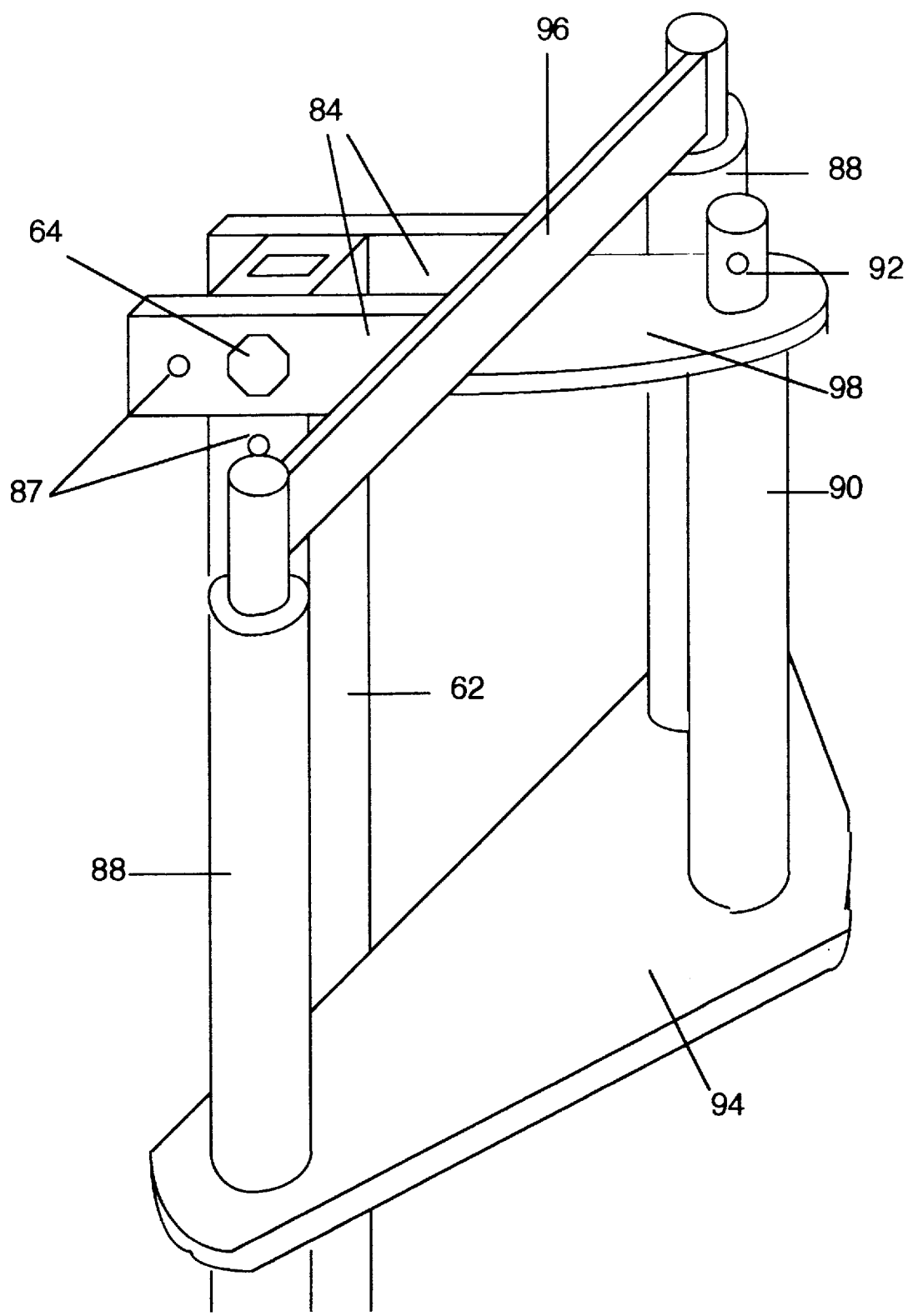

Referring to FIGS. 6A and 6B, representative embodiments of a multi-use carrier of the present invention are shown attached to base 58 for a square receiver hitch. As illustrated in FIG. 6A the multi-use carrier assembly consists of model arm 62 attached to base 58 by inserting and tightening base pin 66 and hinge pin 64 through hinge plates 60. In the up position, model arm 62 extends vertically upward from base 58. The carrier assembly, comprised of a cross bar 96 with a locking plate 98, a security hole 99, and two cargo bars and cushions 88; and a security assembly 94 with security bar and cushion 90 and lock hole 92 attaches to the distal end of model arm 62 by inserting and tightening a carrier pin 86 and hinge pin 64 (FIG. 6B) through carrier hinge plates 84. FIG. 6B further illustrates the multi-use carrier in the down or vertical position. This configuration is obtained by withdrawing a carrier pin 86 (shown in FIG. 6A) from carrier pin hole 87 and pivoting the carrier assembly around hinge pin 64.

Figure 7:
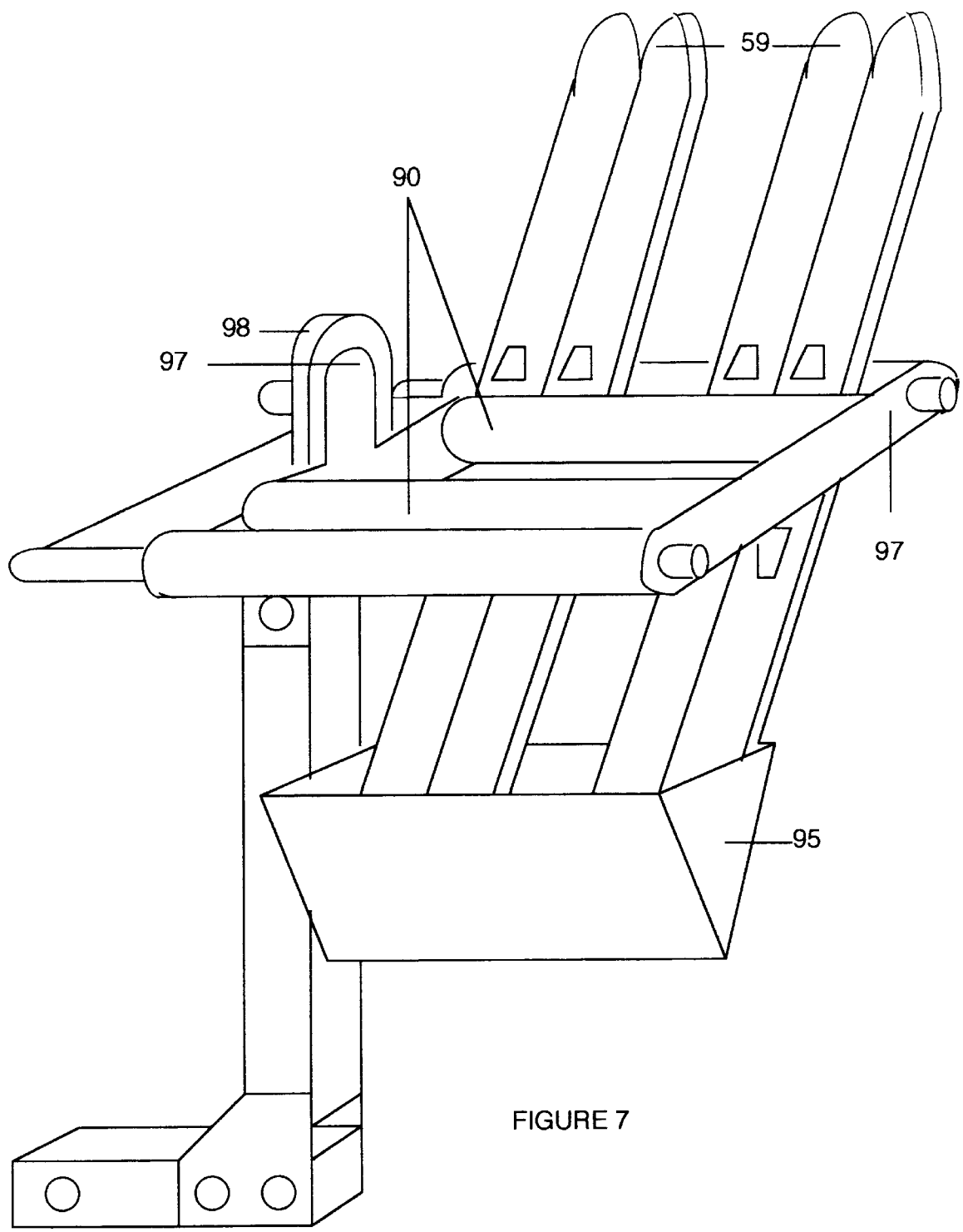
FIG. 7 shows the optional ski carrier assembly.

Additional ski, snowboard, or other equipment carrier capacity may be added by installing another multi-use carrier assembly on the model arm between the base and the top carrier and/or extending the length of the carrier model arm so that more carrier assemblies may be added. A representative embodiment of an optional large capacity ski accessory for the present invention is illustrated in FIG. 7. This accessory includes a security bracket 97 with two security bars and cushions 90 and a bottom bracket 95 which permits skis 59 to be loaded and secured on the carrier assembly. FIG. 7 illustrates skis loaded on only one side of the carrier. This accessory doubles the carrying capacity of a standard multi-use carrier.

Figure 8A:
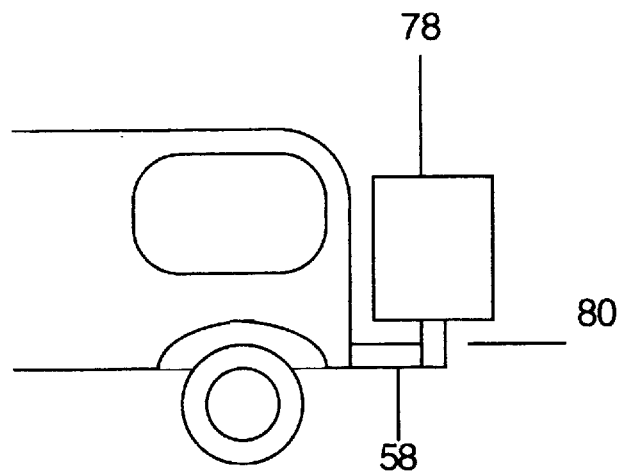
FIGS. 8A and 8B show the optional cargo box carrier in the travel and loading positions.
Figure 8B:
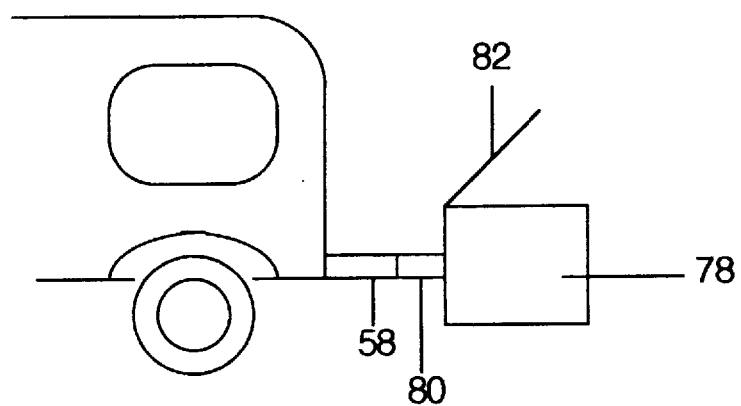

FIGS. 8A and 8B illustrate a representative embodiment of a cargo carrier 78 adapted for use with a base 58. A pivoting model arm 80 attaches the cargo carrier to base 58 and permits cargo carrier box 78 to be loaded horizontally and then raised to the vertical position for travel.

From the preceding description, a number of advantages of my dual length, double hitch, hinged, multi-use carrier system become evident.

(a) The base of the current invention is designed so that it can be installed with square hitch receivers, step bumper hitches, and custom hitches.

(b) The carrier system can be used with vehicles having externally mounted spare tires on the rear of the vehicle.

(c) When used with a square hitch receiver, the carrier permits towing a trailer while the carrier is loaded or unloaded.

(d) Mechanisms to prevent side-to-side sway have been designed to accommodate various types of hitches.

(e) Access to the rear of the vehicle is accomplished by removing the base pin and pivoting the model arm downward and away from the rear of the vehicle.

(f) The use of tightening pins both assures rigidity throughout the carrier frame and permits the carrier arm and the carrier assembly to pivot.

(g) The folding feature of the system allows the carrier to be packaged, shipped, and sold fully assembled and makes mounting on the vehicle loading with equipment, and storing the carrier convenient and easy.

(h) A single multi-use carrier accommodates bicycles, snow and water skis, snowboards, snow shoes, and other types of equipment that will fit in the assembly without additional costly or complicated accessories and without taking any of the equipment apart.

(i) If additional carrying capacity is desired, one or more multi-use carrier assemblies can be attached to the standard length model arm or a longer model arm. An increased capacity accessory which doubles the capability for carrying additional skis, snowboards, etc. has also been designed.

(j). The multi-use carrier can be used as a field expedient stand to repair, adjust, or clean equipment.

(k). A single base accommodates both the multi-use carrier and the cargo box carrier.

OPERATIONS—FIGS. 2A, 2B, 2C, 3, 4A, 5, 6A, 6B, 7, 8A, AND 8B

The multi-use carrier comes fully assembled with the base folded up on the model arm and the carrier assembly folded down. To install on a square hitch receiver, base 58 (FIG. 4A) is inserted into receiver 22 (FIG. 4A) and tightening pin 57 (FIG. 3B) used to secure the base tightly against the side wall of the receiver. Installation on a step bumper or custom hitch requires switching model arm 62 (FIG. 5) to the end of base 58 (FIG. 5) opposite hinge stop/towing plate 42 (FIG. 5). This is done by removing base pin 66 and hinge pin 64 (FIG. 5) and detaching model arm 62 from the base 58. Next model arm 62 is positioned on the other end of base 58 and base pin 66 and hinge pin 64 screwed into tightening pin holes 44 (FIG. 2A) in the opposite end of base 58.

Installing carrier base 58 on a step bumper or custom hitch requires using a towing ball or bolt to secure the towing plate in place. Side-to-side sway of the base is eliminated by sliding the base in towing plate slot 43 (FIGS. 2B and 2C) against the outside edge of the bumper or the hole placement designed for specific models of step bumpers. For simplicities sake, the remainder of the illustrations and pictures will use the square hitch receiver configurations, although each example could also be done using the step bumper or custom hitch configuration. The only exception to this fact is that a trailer can be towed with the carrier in place only when a square hitch receiver is used (FIG. 2A).

The cargo assemby is raised to the horizontal position (FIG. 6A) and secured by carrier pin 86 (FIG. 6A). If access to the rear of the vehicle is desired, base pin 66 (FIG. 4A) is removed and hinge pin 64 (FIGS. 4A and 4B) loosened and the carrier assembly pivoted away from the vehicle (FIG. 4B).

To prepare the multi-use carrier for loading, security assembly 94 (FIG. 6A) is removed simply by pulling the assembly horizontally away from the vehicle. Bicycles, skis, snowboards and other equipment are loaded by placing the items horizontally on cargo bars and cushions 88 (FIG. 6A).

The items are secured to the carrier by replacing security assembly 94 and attaching a padlock or clip through lock hole 92 (FIG. 6A). Twice the number of skis or snowboards can be transported with the multi-use carrier if the items are carried in a bottom-to-bottom position. If desired, bicycles can be further secured to model arm 62 with straps or stretch cords.

To operate the larger capacity ski/snowboard accessory (FIG. 7), the rearward end of the skis or snowboards are placed in bottom bracket 95 (FIG. 7) and the mid-part of the ski against the interior side of security bar and cushion 90 (FIG. 7). Items are placed against both sets of cargo bars and cushions 88 (FIG. 6A) and security bracket 97 (FIG. 7) replaced and locked. Security bars and cushions 90 (FIG. 7) are positioned so that the toe pieces and heel plates are on either side of the bars or so that the bars are between the forward and rear bindings of the snowboards. Placing the skis or snowboards bottom-to-bottom allows twice as many items to be carried than if each item is placed bottom down against the bars.

Cargo carrier 78 (FIGS. 8A and 8B) utilizes the same base system as the multi-use carrier. The cargo model arm 80 (FIGS. 8A and 8B) is part of the cargo carrier frame. Removing and replacing base pin 66 and hinge pin 64 (FIG. 4A) permits cargo carrier 78 to be pivoted down for loading and back up for transporting.

SUMMARY, RAMIFICATIONS, AND SCOPE

Accordingly, the multifarious carrier system of this invention is simple to install, easy and versatile to use, and convenient to store. Furthermore, the multifarious carrier system has the additional advantages in that:

it can be mounted with a variety of hitch configurations on the rear of vehicles, with or without externally mounted spare tires or other equipment;

it permits access to the rear of the vehicle;

it is easy to load and unload, requiring only the removal and replacement of the security assembly;

it accommodates different types of equipment without additional costly accessories;

it can be easily adapted to increase the carrying capacity for equipment such as skis or snowboards;

it allows for utilizing cargo boxes or other kinds of custom designed carrier assemblies;

it folds for convenient storage when not in use; and it can be used as a field work stand to repair or tuneup equipment.

Although the description above contains many specifications, these should not be construed as limiting the scope of the invention but as merely providing illustrations of some of the presently preferred embodiments of this invention. Examples of potential modifications to the present invention include, but are not limited to: multi-use carrier security assembly 94 (FIG. 7A) and/or locking plate 98 (FIG. 7A) may have different shapes; instead of the distal ends of cargo bars and cushions 88 (FIG. 7A) and the proximal end of security bar and cushion 90 (FIG. 7A) sliding through holes in the plates, another means of attaching the bars to the plates might be developed; more than one model arm could be used; round instead of square stock could be used for portions of base 58, supporting arm(s) 62, or the carrier assembly frame; instead of attaching only horizontally in the hitch, base 58 could be angled upward to allow greater ground clearance at the distal end of base 58; and the multi-use carrier might be attached to the rear of the vehicle by means other than by attachment to a trailer hitch, such as attaching to the spare tire mount. Thus the scope of the invention should be determined by the appended claims and their legal equivalents, rather than by the examples given.

I claim:

1. A cargo carrier system adapted for use on the rear of a vehicle, said system comprising:

a vehicle attachment means having first and second ends wherein one of said ends is adapted to be secured to the vehicle;

an elongate, vertically extending support means having a lower end having means for pivotally attaching said support means to the other of said ends of said vehicle attachment means and an upper end;

a carrier means for holding cargo wherein said carrier means is pivotally attached to said upper end of said support means, said carrier means comprising a first member having opposite first and second ends substantially transversely aligned with said upper end of said support means and support members having first ends respectively attached to each said end of said first member and extending rearwardly from the vehicle toward distal second ends thereof wherein said support members are adapted to support cargo, and said first member further having a security hole positioned between said opposite ends; and a security means for inhibiting unauthorized removal of the cargo, said security means comprising a first security element having opposing ends, each of said opposing ends of said first element having at least one hole therein adapted to receive a respective one of said second ends of said support members, a second security element having a first end secured to said first security element and a second end wherein said first and second elements are substantially transversely aligned, said second end of said second element adapted to be received in said security hole of said first member and having a locking means associated therewith whereby attachment of said security means to said carrier means supporting cargo inhibits unauthorized removal of the cargo.

2. The carrier system of claim 1 further comprising a bracket means attached to said support means intermediate said lower and upper ends thereof such that said bracket means is located below said carrier means, said bracket means adapted to provide additional support for the cargo supported by said carrier means when said security means is connected with said carrier system.

3. The carrier system of claim 1, wherein at least one of said support members and said second security element includes cushioning thereon.

4. The carrier system of claim 1 wherein said first end of said vehicle attachment means is adapted to be received in a tubular trailer hitch receiver on a vehicle and said second end of said vehicle attachment means is adapted to be connected to a towing ball on a vehicle and wherein said pivotal attachment means attaching said support means to one of said ends of said vehicle attachment means is selectively attachable such that, in use, when said first end of said vehicle attachment means is attached to a vehicle, said support means is attached to said second end thereof, and when said second end of said vehicle attachment means is attached to a vehicle, said support means is attached to said first end thereof.

5. The carrier system of claim 1 wherein said one end of said vehicle attachment means is adapted to be received in a tubular receiver hitch on the vehicle and wherein the hitch includes at least one hitch pin hole, said one end of said vehicle attachment means including at least one threaded hole, a tightening pin comprising an elongated shaft having a first threaded end adapted to cooperate in a threaded manner with said threaded hole and a second end having a hole therethrough adapted to receive a locking device, wherein the hitch pin hole and said threaded hole are aligned, said pin is inserted in said aligned holes and said threaded end is coupled to said threaded hole such that said hole at said second end of said pin is exposed and adapted to receive the locking device.

6. The carrier system of claim 1 wherein said one end of said vehicle attachment means is adapted to receive a towing ball device on the vehicle, said one end of the vehicle attachment means having a towing plate attached thereto, said towing plate having an elongated slot adapted to receive the towing ball device.

* * * * *